J. H. HISCOCK.
ATTACHMENT FOR EDGING OR JOINTING MACHINES.
APPLICATION FILED FEB. 4, 1915.
1,141,709.
Patented June 1, 1915.
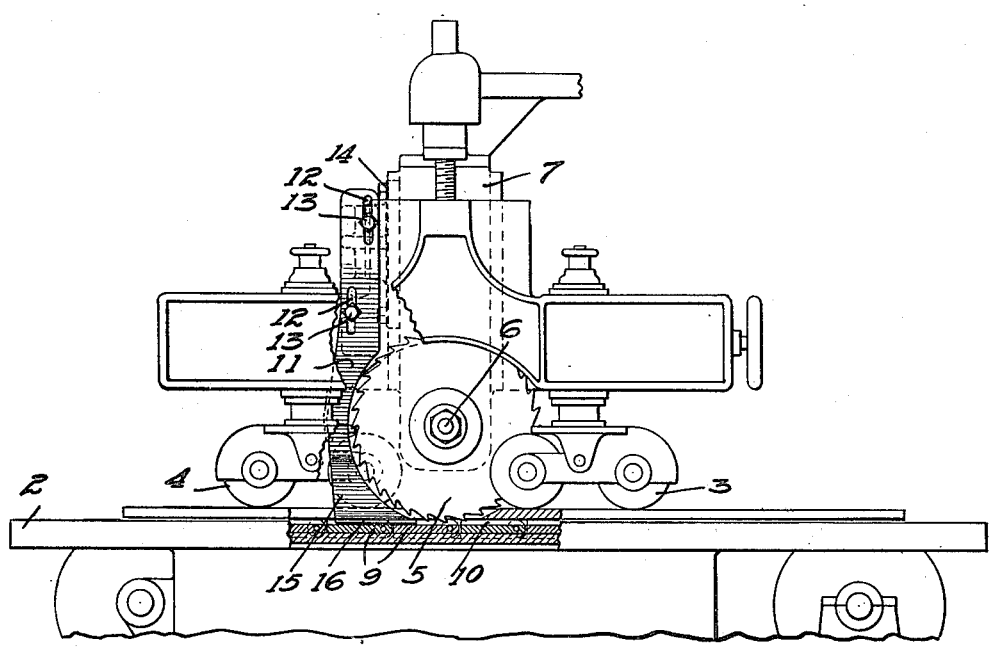
FIG. 1.
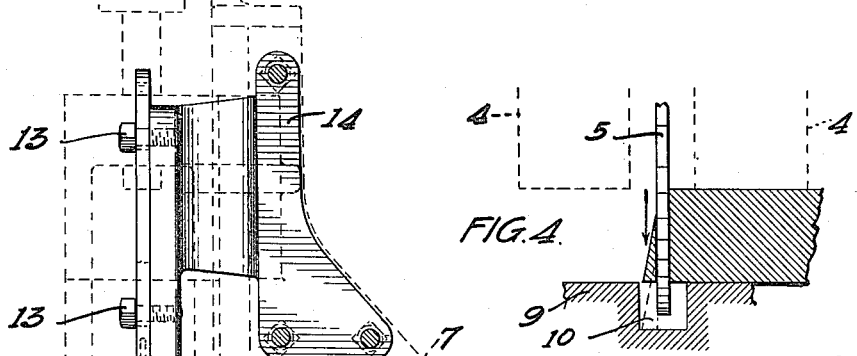
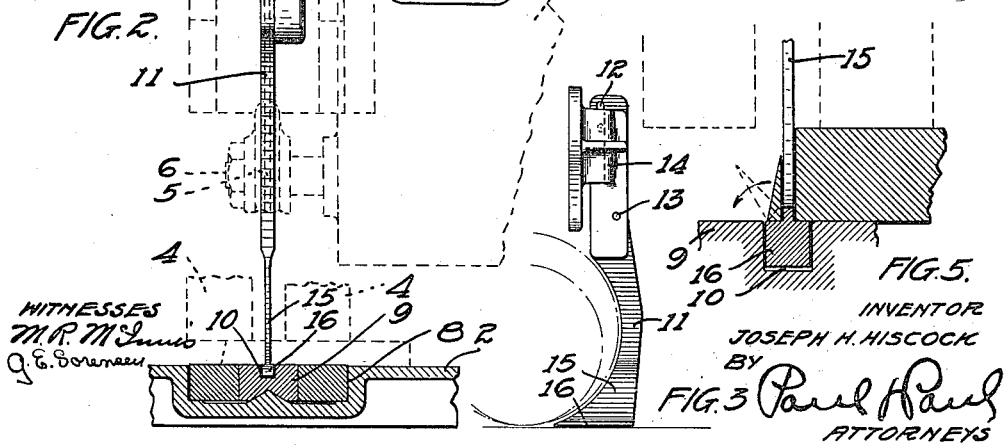
INVENTOR
JOSEPH H. HISCOCK

UNITED STATES PATENT OFFICE.

JOSEPH H. HISCOCK, OF MINNEAPOLIS, MINNESOTA.

ATTACHMENT FOR EDGING OR JOINTING MACHINES.

1,141,709.             Specification of Letters Patent.          Patented June 1, 1915.

Application filed February 4, 1915. Serial No. 6,055.

*To all whom it may concern:*

Be it known that I, JOSEPH H. HISCOCK, citizen of the United States, resident of Minneapolis, county of Hennepin, State of Minnesota, have invented certain new and useful Improvements in Attachments for Edging or Jointing Machines, of which the following is a specification.

In the operation of a machine for edging or jointing lumber, where the saw is mounted above the feed table instead of below it, as usual in machines of this type, the saw operates or depends into a longitudinal recess in the table top and within a slot in the feed chain, and it often happens that an edging that is too narrow to be gripped between the table and the feed rolls will drop into the slot in the chain and be driven out over the table by the teeth of the saw with great force and frequently cause severe injury to the machine attendant.

The object therefore, of my invention is to provide means which will positively prevent a narrow edging or strip cut off by the saw from dropping into the slot in the chain where it will come in contact with the saw teeth.

A further object is to provide a device of simple construction and which can be easily applied to a machine of this type without any material change therein.

The invention consists generally in various constructions and combinations, all as hereinafter described and particularly pointed out in the claims.

In the accompanying drawings forming part of this specification, Figure 1 is a side view, partially in section, of an edging or jointing machine embodying my invention, Fig. 2 is a transverse sectional view through the feed table of the machine, showing the attachment mounted on the machine frame and depending into the slot in the feed chain, Fig. 3 is a side view of the attachment, Fig. 4 is a detail sectional view, illustrating in full size the relative position of the feed chain and the saw, with the attachment omitted, Fig. 5 is a similar view, showing the attachment in place.

In the drawing, 2 represents the feed table of a jointing or edging machine and 3 and 4 the feed rolls arranged upon opposite sides of the overhanging circular saw 5. This saw has an arbor 6 supported in suitable bearings in a bracket 7 on the machine frame. The table 2 is provided with a longitudinal recess 8 in which a suitable feed chain or belt 9 operates. This chain is provided with a centrally arranged longitudinal slot 10 into which the teeth of the saw 5 depend, as indicated in Fig. 4.

11 is a hanger, provided with vertical slots 12 therein to receive bolts 13 for adjusting said hanger vertically on a flange 14 which projects outwardly from the bracket 7. This vertical adjustment of the hanger is for the purpose of adapting the device for saws of different sizes. The lower portion of the hanger 11 has a comparatively thin section 15 in the plane of the saw adapted to travel in the saw cut, being of substantially the same or less thickness than the saw. The lower end of the hanger is provided with a foot 16 of greater width than the thickness of the section 15 and depending into the slot 10 in the chain. The top of this foot is preferably flush with the top of the chain and the slot in the chain is practically filled by this shoe, sufficient clearance being left to allow the chain to run freely in the table. This shoe effectually closes the slot against the entrance of edgings or narrow pieces of wood cut off by the saw, the edging, as indicated in Fig. 5, being frequently too narrow to be caught between the surface of the table and the feed rolls. Such an edging would ordinarily drop down into the slot in the feed chain, be caught by the teeth of the saw and thrown out with great violence, but by filling this slot with the shoe the entrance of the edging therein is positively prevented and there will be no chance for the saw teeth to engage the edging and discharge it from the machine, and injury to the attendant from flying pieces of wood that are too small to be caught by the feed rolls will be prevented. It will be understood, as shown in Fig. 1, that this shoe is preferably recessed on one side to conform to the curvature of the saw and at its lower edge extends along the recess under the saw a sufficient distance to guide the strips of edging out of the path of the saw as fast as they are cut off.

In various ways the details of construction herein shown and described may be modified and still be within the scope of my invention.

I claim as my invention:

1. The combination, with a table, of a feed chain operating therein and composed of links having a longitudinal slot therein, a circular saw having teeth operating within said slot as said chain is moved along, and means depending within said slot in the rear of the saw for guiding edging strips out of the path of the saw teeth.

2. The combination, with a table having a recess in the top thereof and a feed chain operating within said recess and provided with a slot running lengthwise of said chain, a circular saw depending within said recess and said slot, and a shoe mounted in the rear of the saw and fitting within said slot beneath and adjacent the teeth of the saw.

3. The combination, with a table having a recess and a slotted feed belt operating therein, of a circular saw having its teeth depending within said slot, a hanger mounted in the plane of the saw and provided with a shoe fitting within the slot in said belt adjacent to and beneath the teeth of the saw, said shoe operating to deflect edgings and the like out of said slot and out of the path of the saw teeth.

In witness whereof, I have hereunto set my hand this 30th day of January 1915.

JOSEPH H. HISCOCK.

Witnesses:
EDWARD A. PAUL,
G. E. SORENSEN.